United States Patent
Feibelman

(10) Patent No.: US 6,330,758 B1
(45) Date of Patent: Dec. 18, 2001

(54) ELECTRONIC ARTICLE SURVEILLANCE TAG FOR EYEGLASSES AND A METHOD FOR ATTACHING THE ELECTRONIC ARTICLE SURVEILLANCE TAG TO A PAIR OF EYEGLASSES

(75) Inventor: Jeffrey A. Feibelman, East Greenwich, RI (US)

(73) Assignee: Display Technologies, Inc., Johnston, RI (US)

(*) Notice: Subject to any disclaimer, the term of this patent is extended or adjusted under 35 U.S.C. 154(b) by 0 days.

(21) Appl. No.: 09/371,068

(22) Filed: Aug. 9, 1999

(51) Int. Cl.⁷ ........................................ G09F 3/10
(52) U.S. Cl. ................ 40/299.01; 40/316; 70/57.1; 351/158
(58) Field of Search ................ 40/299.01, 594, 40/665, 673, 625, 316; 351/158; 70/57.1

(56) References Cited

U.S. PATENT DOCUMENTS

| | | |
|---|---|---|
| 2,907,586 | 10/1959 | Paxton et al. . |
| 3,738,034 | 6/1973 | Seaver . |
| 4,331,394 * | 5/1982 | Girard ............................ 351/158 |
| 4,336,087 * | 6/1982 | Martuch et al. .................. 40/316 X |
| 4,636,271 * | 1/1987 | Gandolfo ........................ 40/316 X |
| 4,991,413 * | 2/1991 | Arnaldo ............................ 70/19 |
| 5,079,540 * | 1/1992 | Narlow et al. .................... 340/572 |
| 5,119,652 * | 6/1992 | Costa ............................. 70/57.1 |
| 5,144,820 * | 9/1992 | Homgren ......................... 70/57.1 |
| 5,387,012 * | 2/1995 | Hibbs ............................. 283/75 |
| 5,437,172 * | 8/1995 | Lamy et al. ...................... 70/57.1 |
| 5,537,765 | 7/1996 | Liebman et al. . |
| 5,629,677 * | 5/1997 | Staino, Jr. ...................... 340/568 |
| 5,677,673 | 10/1997 | Kipnis . |
| 5,775,018 * | 7/1998 | Steinborn ...................... 40/299.01 |
| 5,848,488 * | 12/1998 | Norwood ....................... 40/673 X |
| 5,884,425 | 3/1999 | Baldwin . |
| 6,023,864 | 2/2000 | Liebenow . |
| 6,120,146 * | 9/2000 | Harris ............................ 351/158 |
| 6,145,167 * | 11/2000 | Brentini ......................... 40/665 X |

* cited by examiner

*Primary Examiner*—Brian K. Green
*Assistant Examiner*—James M Hewitt
(74) *Attorney, Agent, or Firm*—Salter & Michaelson

(57) ABSTRACT

An apparatus for securing a tag to a pair of eyeglasses is disclosed. The apparatus includes a tag having a body and at least one prong extending longitudinally across the body so as to define an aperture between the body and the at least one prong and a tube constructed from a material which shrinks when subjected to heat. The prong and the temple piece are disposed within the tube and the tube is subjected to heat, thereby shrinking the tube to secure the prong to the temple piece of the eyeglasses.

23 Claims, 3 Drawing Sheets

ELECTRONIC ARTICLE SURVEILLANCE TAG FOR EYEGLASSES AND A METHOD FOR ATTACHING THE ELECTRONIC ARTICLE SURVEILLANCE TAG TO A PAIR OF EYEGLASSES

BACKGROUND OF THE INVENTION

1. Field of the Invention

The present invention relates generally to merchandise tags, particularly electronic article surveillance tags, and more particularly to an apparatus for attaching an electronic article surveillance device to a pair of eyeglasses and the method for attaching the electronic article surveillance device to the eyeglasses.

2. Discussion of the Related Art

The theft of small articles such as eyeglasses in retail establishments is a prevalent problem which costs merchandisers millions of dollars every year in losses. Since a thief can simply wear or conceal eyeglasses in order to remove them from an establishment without paying for them, controlling this type of theft can be very difficult.

There have been a number of attempts to thwart this type of theft through the use of electronic surveillance tags (hereinafter "EAS tags") which are attached to the eyeglasses. While the use of EAS tags is an effective deterrent, the attachment of the EAS tags to the eyeglasses can be problematic due to the limited areas on which to place an EAS tag.

There are several devices which attempt to attach EAS tags to eyeglasses in order to reduce the aforementioned losses. U.S. Pat. No. 5,079,540 to Narlow et al. discloses a tag having an adjustable loop for attachment to the temple piece of a pair of eyeglasses. The tag includes a wedge device which secures the tag to the temple piece. U.S. Pat. No. 5,119,652 to Costa discloses a tag which is folded over the temple piece of a pair of eyeglasses and locked into place using a special locking element that must be broken to remove the tag. U.S. Pat. No. 5,144,820 to Holmgren discloses a tag which is attached to the temple piece of a pair of eyeglasses and held in place by means of a threaded screw device. While these devices may be effective in deterring the theft of eyeglasses, due to the complexity of the devices and the ways that they are attached to the eyeglasses, they are expensive to manufacture and therefore require that the salesperson remove the devices at the point of sale. This removal requires special tools, so as to prevent the removal of the tags by a potential thief, and results in increased checkout times. U.S. Pat. No. 5,437,172 discloses a security hanger for eyeglasses which is secured to the bridge of the eyeglasses. This device also requires a special tool for removal and hampers the customer's ability to try on the eyeglasses, as the tag makes it virtually impossible to properly seat the glasses on the customer's face.

What is needed therefore is an electronic article surveillance tag which is inexpensive to manufacture and simple to secure to the frame of a pair of eyeglasses without interfering with the ability of the customer to try on the eyeglasses.

SUMMARY OF THE INVENTION

The present invention includes a tag which is capable of housing an electronic article surveillance (EAS) device. The tag includes a cavity into which the EAS device is concealed behind an adhesive label which is placed over the cavity and a number of prongs over which a sleeve of shrink wrap is placed. The temple piece of the eyeglass is then inserted into the sleeve of shrink wrap, preferably until the shrink wrap covers a portion of the hinge of the eyeglasses. Then shrink wrap is then heated, thereby shrinking the sleeve such that it tightly secures the tag to the eyeglasses. Due to the nature of the shrink wrap, once the tag is secures to the eyeglasses, it is very difficult to remove, requiring the sleeve to be cut in order to remove the tag. The invention discourages the theft of the eyeglasses while allowing a customer to comfortably try them on. Furthermore, the invention is very inexpensive to manufacture and attach to the eyeglasses, thereby eliminating the need for a salesperson to remove the tag at the point of sale.

According to one embodiment of the invention, an apparatus for securing a tag to a pair of eyeglasses is disclosed. The apparatus includes a tag having a body and at least one prong extending longitudinally across the body so as to define an aperture between the body and the at least one prong and a tube constructed from a material which shrinks when subjected to heat. The prong and the temple piece are disposed within the tube and the tube is subjected to heat, thereby shrinking the tube to secure the prong to the temple piece of the eyeglasses. The body includes a front surface, a rear surface, a top edge, a bottom edge and opposing side edges, the at least one prong being attached to the body proximate a side edge thereof and extending toward the other side edge along the top edge, so as to define the aperture between the top edge and the prong. The body includes a recess formed in the front surface, the recess being constructed and arranged for receiving an electronic article surveillance device and a label which is attached to the front surface of the body, so as to conceal the recess.

According to another embodiment of the invention, a method for attaching a tag to a pair of eyeglasses is disclosed. The method includes the steps of inserting a prong of the tag and the temple piece of the eyeglasses into a tube of a material which shrinks when heated and applying heat to the tube, causing the tube to shrink, thereby securing the prong to the temple piece.

Other features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION

Figure 1A:
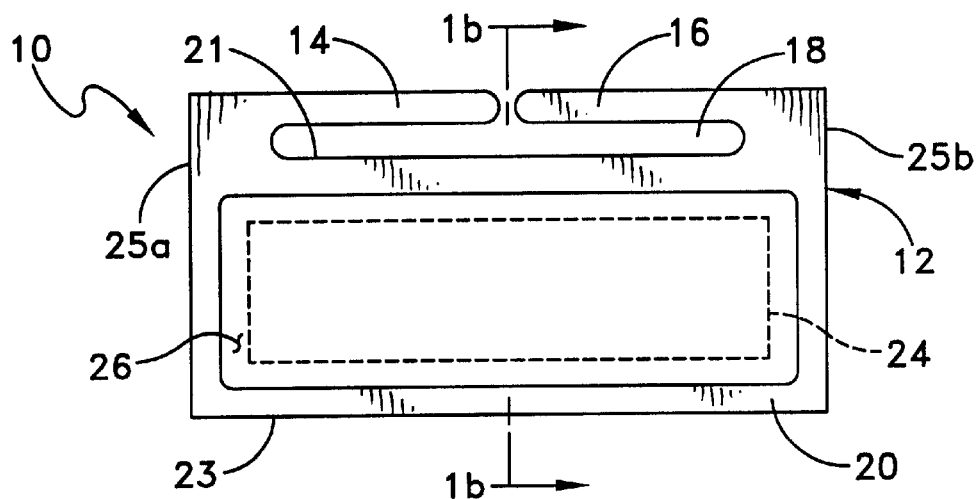
FIG. 1*a* is a front view of an eyeglass electronic article surveillance tag in accordance with the present invention.
Figure 1B:
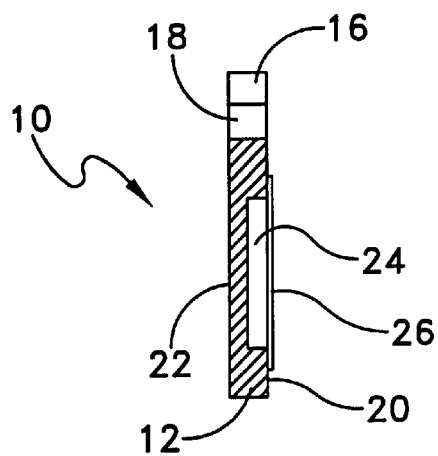
FIG. 1*b* is a diagram showing a cross-sectional view of the invention, taken along line 1*b*—1*b* of FIG. 1*a*.

Referring now to the figures, and more particularly to FIGS. 1*a* and 1*b,* the electronic article surveillance (EAS) tag of the present invention will be described. The EAS tag, generally indicated at 10, includes a planar body 12, which is generally rectangular in shape and has a front surface 20, rear surface 22, a top edge 21, a bottom edge 23, and opposing side edges 25a, 25b. Tag 10 includes a pair of prongs 14 and 16 which are formed along the top edge of body 12, the prongs 14 and 16 lying in the same plane as the body 12 and extending from the side edges 25a, 25b of body 12 inwardly toward each other, the body 12 and the prongs 14 and 16 cooperating so as to form an aperture 18 between the body 12 and the prongs 14 and 16. The tag 10 is preferably formed by an injection-molding process from a relatively stiff, but not brittle, material, such as plastic. Preferably, the tag 10 is approximately 3 to 5 centimeters wide and 1 to 3 centimeters high. The thickness of the tag 10 is preferably approximately 3 to 10 millimeters.

The tag 10 also includes a recess 24 (shown in phantom in FIG. 1a) formed in the front surface 20 of the body 12. The recess 24 is sized to receive an electronic surveillance device (not shown), such as the type which sets off an alarm if the device is carried beyond a surveillance area before the device is deactivated by a salesperson. In order to conceal the electonic surveillance device and to render the device more difficult to remove, a label 26 is placed onto the front surface 20 of the body 12, so as to cover the recess 24. The label 26 is preferably attached to the body 12 with an adhesive and may have indicia printed thereon to indicate a brand name, model name or the like.

Figure 2:
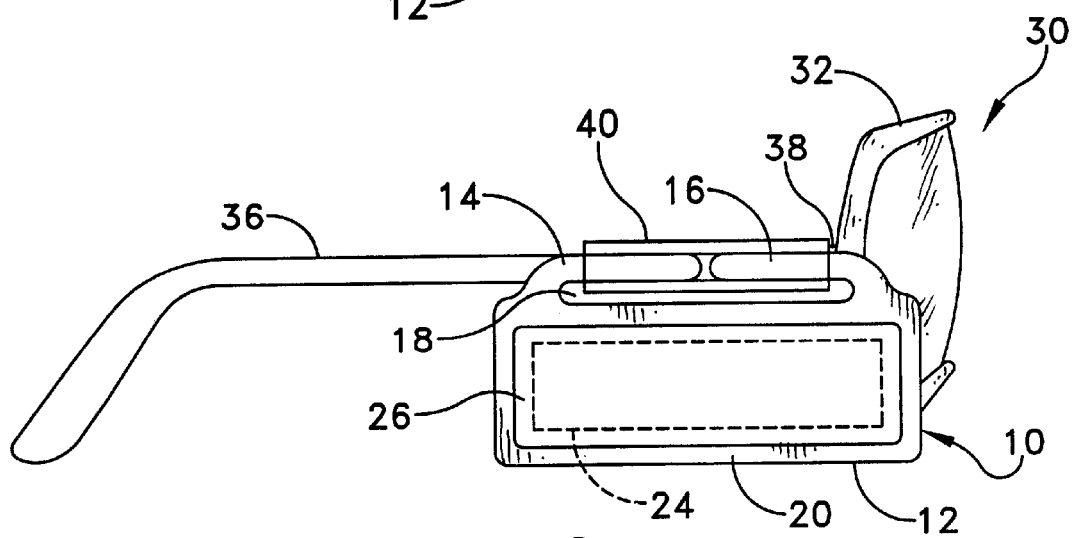
FIG. 2 shows how the tag of FIG. 1 is secured to a pair of eyeglasses.

Referring now to FIG. 2, the method of securing the tag 10 to a pair of eyeglasses will be described. Shown in FIG. 2 is a pair of eyeglasses 30 including a lens frame 32, lenses 34 a temple piece 36 and a hinge 38 for attaching the temple piece 34 to the lens frame 32. In order to secure the tag 10 to the eyeglasses 30, each end of a small-diameter sleeve or tube 40 of a heat-activated shrink wrap material such as PVC is inserted over one of the prongs 14 and 16. The sleeve 40 has a length which preferably is the same as the width of the aperture 18 of the tag 10. The temple piece 36 of the eyeglasses 30 is then inserted through the sleeve 40 and the tag is slid toward the lens frame 32 and preferably over the hinge 38. The sleeve 40 is then subject to a heating process, causing the sleeve 40 to shrink and harden, thereby tightly securing the tag 10 to the eyeglasses 30. Preferably, the hinge 38 is also slid into the sleeve 40 before the sleeve is shrunk, thereby enabling the hinge to be used as an anchor for further securing the sleeve 40 to the eyeglasses 30. Although it is desirable to use the hinge 38 of the eyeglasses as an additional anchor for the sleeve 40, this is not required for properly securing the tag 10 to the eyeglasses 30, since, in some styles of eyeglasses, the hinge is too small to effect the adherence of the sleeve 40 to the temple piece 36. It has been found, however, that the effectiveness of the attachment of the tag 10 to the temple piece 36 is not compromised.

After the sleeve 40 has been shrunk to secure the tag 10 in place, it is very difficult to remove. Since, after the heating process, the sleeve 40 shrinks to a form which tightly secures the tag 10 to the temple piece 36 and the hinge 38 without leaving any gaps or loose material, and due to the length of the sleeve 40 as well as the length of prongs 14 and 16, the tag 10 can only be removed from the eyeglasses 30 by cutting the sleeve 40 with a sharp instrument. Since the tag 10 cannot be pulled, twisted or slid off of the eyeglasses, theft of the eyeglasses is greatly reduced.

Furthermore, due to the placement of the tag 10 on the temple piece 36, the eyeglasses can be displayed in a conventional manner and the customer can try on the eyeglasses in an unrestricted manner, since the tag 10 does not interfere with the fit of the eyeglasses.

Figure 3:
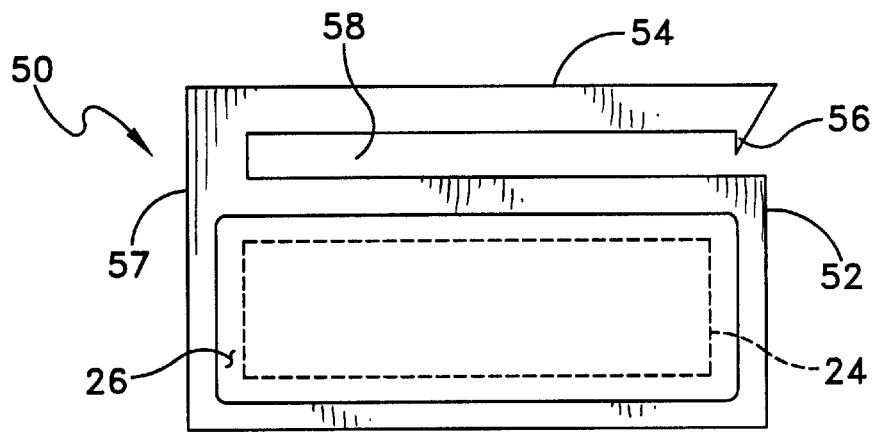
FIGS. 3–5 show alternative embodiments of the present invention.

Referring now to FIGS. 3–6, alternative embodiments of the invention will be described. FIG. 3 shows a tag 50 which includes a body 52 and a prong 54, including a downwardly depending barb 56. Prong 54 extends from an extension portion 57 on one side of the body 52 and across the top of the body 52, so as to define an aperture 58 between the body 52 and the prong 54. The body 52 includes a recess 24 which is concealed by a label 26 in an identical manner as the tag shown in FIGS. 1a and 1b.

In use, the sleeve 40 is slid over the prong 54 and the temple piece 36 is inserted through the sleeve 40, which preferably has a length which is substantially the same as the width of the aperture 58, which is the distance between the extension portion 57 and the barb 56. Once in place, the sleeve 40 is shrunk to secure the tag 50 in place in a manner identical to that described with reference to FIG. 2.

Figure 4:
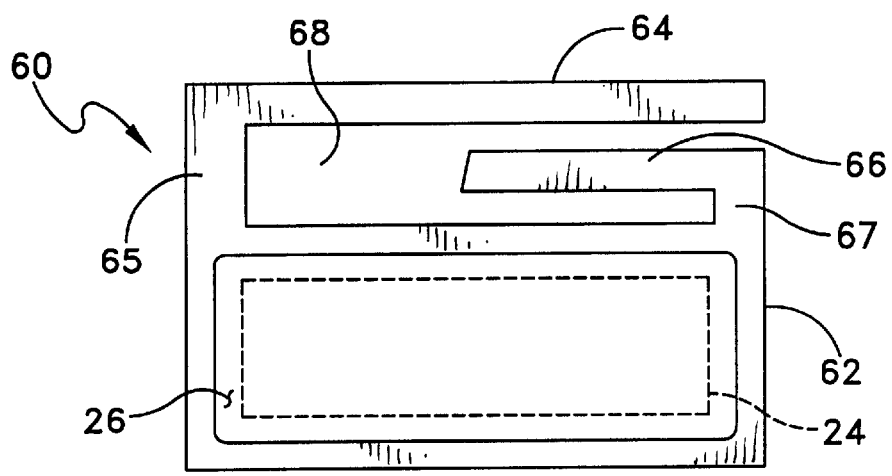

FIG. 4 shows a tag 60 which includes a body 62 and prongs 64 and 66 which extend from extension portions 65 and 67, respectively. As shown in the figure, extension portion 65 is longer than extension portion 67, to allow both prongs 64 and 66 to lie in the same plane as the body 62. Prongs 64 and 66 cooperate so as to define an aperture 68 between the body 62 and the prongs 64 and 66. The body 62 includes a recess 24 which is concealed by a label 26 in an identical manner as the body shown in FIGS. 1a and 1b.

In use, one end of the sleeve 40 is first slid over the prong 64 and then the sleeve 40 is "accordioned" so as to enable the other end of the sleeve 40 to be slid over the prong 66. The temple piece 36 is then inserted through the sleeve 40, which preferably has a length which is substantially the same as the width of the aperture 68, which is the distance between the extension portions 65 and 67. Once in place, the sleeve 40 is shrunk to secure the tag 60 in place in a manner identical to that described with reference to FIG. 2. The configuration of the prongs 64 and 66 further secures the tag 60 to the eyeglasses by preventing the tag from being twisted off of the temple piece.

Figure 5:
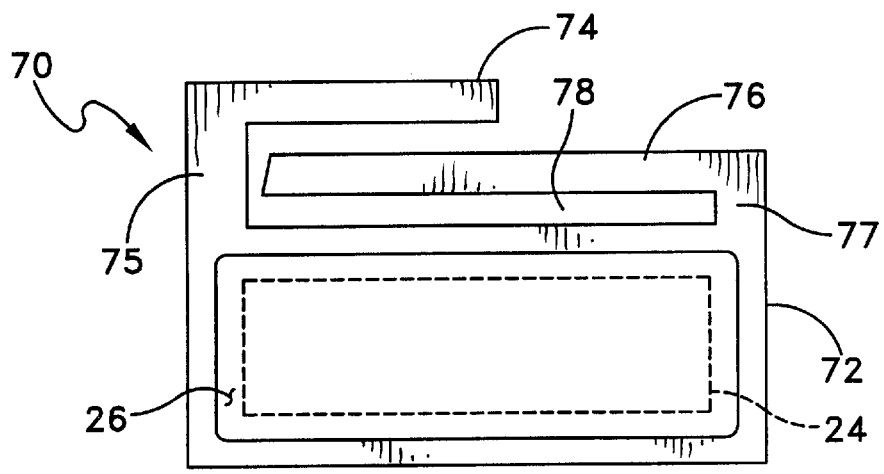

Similarly, FIG. 5 shows a tag 70 which includes a body 72 and prongs 74 and 76 which extend from extension portions 75 and 77, respectively. As shown in the figure, extension portion 75 is shorter than extension portion 77, to allow both prongs 74 and 76 to lie in the same plane as the body 72. Prongs 74 and 76 cooperate so as to define an aperture 78 between the body 72 and the prongs 74 and 76. The body 72 includes a recess 24 which is concealed by a label 26 in an identical manner as the body shown in FIGS. 1a and 1b.

In use, one end of the sleeve 40 is first slid over the prong 76 and then the sleeve is "accordioned" so as to enable the other end of the sleeve 40 to be slid over the prong 74 The temple piece 36 is then inserted through the sleeve 40, which preferably has a length which is substantially the same as the width of the aperture 78, which is the distance between the extension portions 75 and 77. Once in place, the sleeve 40 is shrunk to secure the tag 70 in place in a manner identical to that described with reference to FIG. 2. The configuration of the prongs 74 and 76 further secures the tag 70 to the eyeglasses by preventing the tag from being twisted off of the temple piece.

Figure 6A:
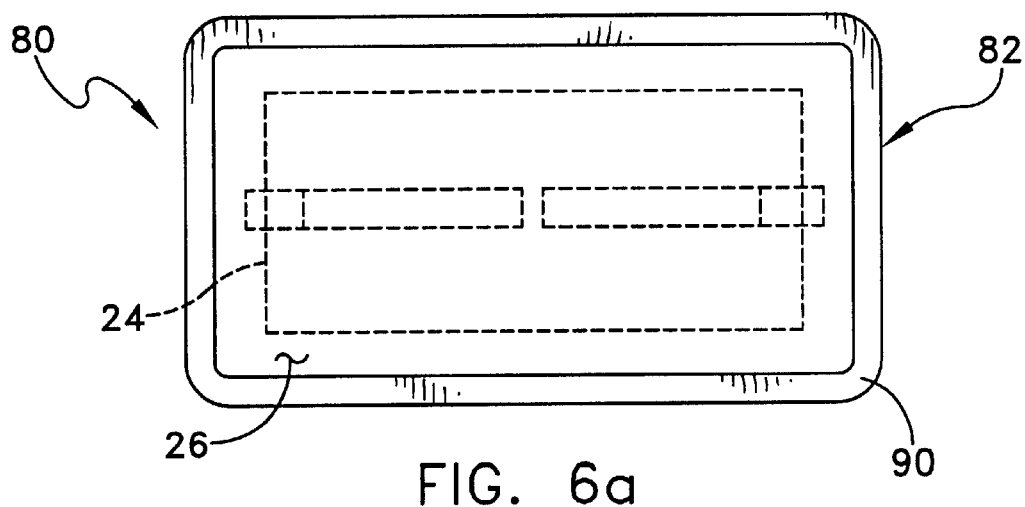
FIGS. 6*a*, 6*b* and 6*c* show front, rear and side views, respectively, of another embodiment of the present invention.
Figure 6B:
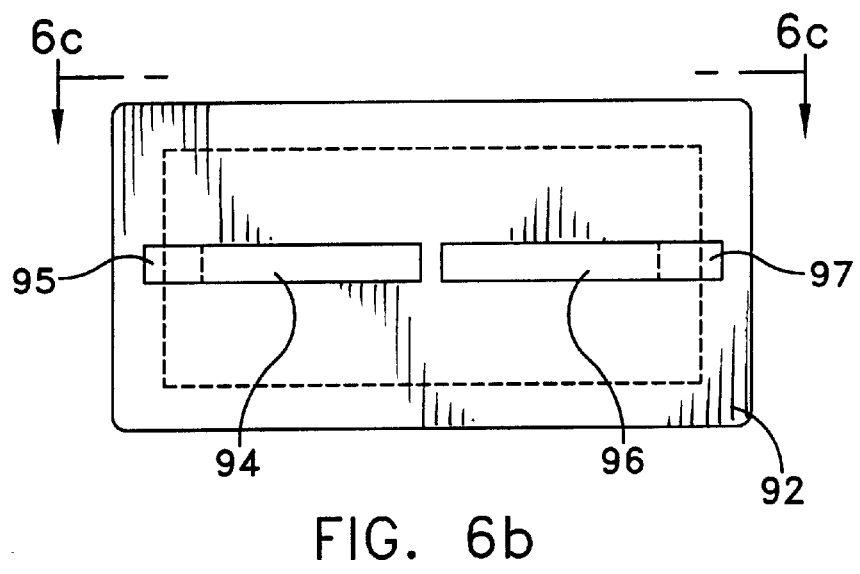
Figure 6C:
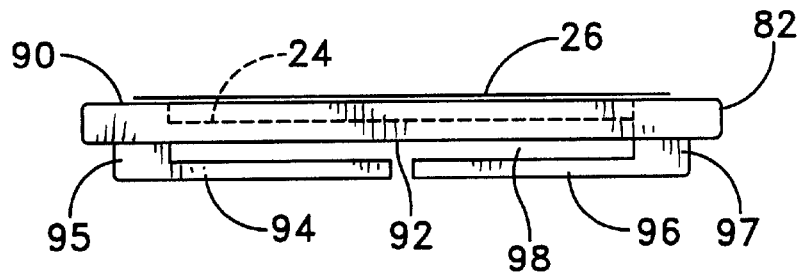

Referring now to FIGS. 6a–6c, another embodiment of the EAS tag of the present invention, generally indicated at 80, will be described. FIG. 6a is a front view of the embodiment, FIG. 6b is a rear view of the embodiment and FIG. 6c is a top view of the embodiment, as seen from line 6c—6c of FIG. 6b.

The tag 80 includes a body 82 having a front surface 90 and a rear surface 92. The body 82 includes a recess 24 which is concealed by a label 26 in an identical manner as the body shown in FIGS. 1a and 1b.

Tag 80 also includes a pair of prongs 94 and 96 which are attached to the rear side 92 of body 82 by a pair of extension portions 95 and 97, respectively. Extension portions 95 and 97 are disposed proximate opposite edges of body 82 at a midpoint of the body 82 and prongs 94 and 96 extend inwardly toward the center of the body 82 from extension portions 95 and 97, respectively. The body 82, extension portions 95 and 97 and prongs 94 and 96 cooperate to define an aperture 98 between the prongs 94 and 96 and the body 82.

In use, one end of the sleeve 40 is first slid over the prong 96 and then the sleeve is "accordioned" so as to enable the other end of the sleeve 40 to be slid over the prong 94 The temple piece 36 is then inserted through the sleeve 40, which preferably has a length which is substantially the same as the width of the aperture 98, which is the distance between the extension portions 95 and 97 Once in place, the sleeve 40 is shrunk to secure the tag 80 in place in a manner identical to that described with reference to FIG. 2. The configuration of the prongs 94 and 96 further secures the tag 80 to the eyeglasses by preventing the tag from being twisted off of the temple piece.

In order to secure the tag 80 to the pair of eyeglasses 30, each end of the sleeve 40 is inserted over one of the prongs 94 and 96 The sleeve 40 has a length which preferably is the same as the width of the aperture 98 of the tag 80 The temple piece 36 of the eyeglasses 30 is then inserted through the sleeve 40 and the tag is slid toward the lens frame 32 and preferably over the hinge 38. The sleeve 40 is then subject to a heating process, causing the sleeve 40 to shrink and harden, thereby tightly securing the tag 80 to the eyeglasses 30.

Based on the foregoing, it can therefore be seen that the present invention provides an inexpensive and convenient apparatus and method for attaching an EAS tag to a pair of eyeglasses. Since the tag is attached to the eyeglasses with an inexpensive sleeve of shrink wrap, removal of the tag by the salesperson is not required, thereby reducing checkout time and any inconvenience for the salesperson and the customer. Furthermore, the placement of the tag on the temple piece of the eyeglasses does not interfere with the ability of the customer to comfortably try on the eyeglasses prior to purchase.

While there is shown and described herein certain specific structure embodying the invention, it will be manifest to those skilled in the art that various modifications and rearrangements of the parts may be made without departing from the spirit and scope of the underlying inventive concept. For example, while the invention is described as being for securing an EAS tag to a pair of eyeglasses, it will be understood that the apparatus and method of the present invention may be utilized to secure an EAS tag to any article of merchandise which is capable of being received within a sleeve of shrink wrap tubing. Also, although the invention is described as being an apparatus and method for attaching an EAS to a pair of eyeglasses, it will be understood that the tag need not necessarily contain an electronic surveillance device. The invention may also be used to attach tags which include merchandise information such as graphics, bar codes, style numbers, prices, etc. Accordingly, the invention is not limited to attaching EAS tags to merchandise, but also applies to the attachment of informational tags to merchandise, which tags do not necessarily contain EAS devices. Furthermore, while the invention is described as being formed of plastic which is injection molded, it will be understood that any material may be used in the manufacture of the apparatus. Accordingly, the inventive concept is not limited to the particular forms herein shown and described except insofar as indicated by the scope of the appended claims.

What is claimed is:

1. A tag and an apparatus for securing the tag to a pair of eyeglasses having a temple piece attached to a lens frame, the tag and apparatus comprising:
   a tag body having at least one prong extending longitudinally across said tag body so as to define an aperture between said tag body and said at least one prong; and
   a tube constructed from a material which shrinks when subjected to heat;
   wherein said tag body is securable to the pair of eyeglasses by inserting the at least one prong and the temple piece within said heat shrinkable tube, such that upon subjecting said tube to heat, the tube shrinks to secure said at least one prong to the temple piece of the eyeglasses.

2. A tag and an apparatus of claim 1, wherein said tube is formed from a shrink wrap plastic material.

3. A tag and an apparatus of claim 2, wherein said body comprises a front surface, a rear surface, a top edge, a bottom edge and opposing side edges, said at least one prong being attached to said body proximate a side edge thereof and extending toward the other side edge along said top edge, so as to define the aperture between said top edge and said at least one prong.

4. A tag and an apparatus of claim 3, wherein said body includes a recess formed in said front surface, said recess being constructed and arranged for receiving an electronic article surveillance device.

5. A tag and an apparatus of claim 4, further comprising a label which is attached to the front surface of the body, so as to conceal said recess.

6. A tag and an apparatus of claim 1, wherein said tube is further constructed and arranged to receive a hinge of the eyeglasses prior to being shrunken, such that said tube is secured to the hinge in addition to the temple piece of the eyeglasses.

7. A tag and an apparatus of claim 2, wherein said body comprises a front surface, a rear surface, a top edge, a bottom edge and first and second side edges and said tag comprises first and second prongs, said first prong being attached to said body proximate said first side edge and said second prong being attached to said body proximate said second side edge, said first prong extending toward said second side edge along said top edge and said second prong extending toward said first side edge along said top edge, so as to define the aperture between said top edge and said first and second prongs.

8. A tag and an apparatus of claim 7, wherein said body includes a recess formed in said front surface, said recess being constructed and arranged for receiving an electronic article surveillance device.

9. A tag and an apparatus of claim 8, further comprising a label which is attached to the front surface of the body, so as to conceal said recess.

10. A tag and an apparatus of claim 2, wherein said body comprises a front surface, a rear surface, a top edge, a bottom edge and first and second side edges and said tag comprises first and second prongs, said first prong being attached to said body proximate said first side edge and said second prong being attached to said body proximate said second side edge, said first prong extending toward said second side edge across said rear surface and said second prong extending toward said first side edge across said rear surface, so as to define the aperture between said rear surface and said first and second prongs.

11. A tag and an apparatus of claim 10, wherein said body includes a recess formed in said front surface, said recess being constructed and arranged for receiving an electronic article surveillance device.

12. A tag and an apparatus of claim 11, further comprising a label which is attached to the front surface of the body, so as to conceal said recess.

13. The tag and apparatus of claim 1, further comprising a barb depending from one of the at least one prong.

14. The tag and apparatus of claim 1, wherein the at least one prong comprises a first prong and a second prong.

15. The tag and apparatus of claim 14, wherein said tag body is securable to the pair of eyeglasses by inserting said first prong, said second prong and a portion of the temple piece within said heat shrinkable tube, such that upon subjecting said tube to heat, the tube shrinks to secure said first prong and said second prong to the temple piece of the eyeglasses.

16. The tag and apparatus of claim 14, wherein said first prong extends from a first extension portion and said second prong extends from a second extension portion, said first extension portion having a length which is longer than a length of said second extension portion.

17. In combination, a pair of eyeglasses having a temple piece attached to a lens frame and an apparatus for attaching an electronic article surveillance device to the eyeglasses, the apparatus comprising:

- a tag having a body and at least one prong extending longitudinally across said body so as to define an aperture between said body and said at least one prong; and
- a tube constructed from a material which shrinks when subjected to heat;
- wherein said at least one prong and said temple piece are disposed within said tube such that upon subjecting said tube to heat, the tube shrinks to secure said at least one prong to said temple piece of the eyeglasses.

18. The combination of claim 17, wherein said tube is formed from a shrink wrap plastic material.

19. The apparatus of claim 18, wherein said body comprises a front surface, a rear surface, a top edge, a bottom edge and opposing side edges, said at least one prong being attached to said body proximate a side edge thereof and extending toward the other side edge along said top edge, so as to define the aperture between said top edge and said at least one prong.

20. The combination of claim 19, wherein said body includes a recess formed in said front surface, said recess being constructed and arranged for receiving an electronic article surveillance device.

21. The combination of claim 20, further comprising a label which is attached to the front surface of the body, so as to conceal said recess.

22. The combination of claim 18, wherein said body comprises a front surface, a rear surface, a top edge, a bottom edge and first and second side edges and said tag comprises first and second prongs, said first prong being attached to said body proximate said first side edge and said second prong being attached to said body proximate said second side edge, said first prong extending toward said second side edge along said top edge and said second prong extending toward said first side edge along said top edge, so as to define the aperture between said top edge and said first and second prongs.

23. The combination of claim 18, wherein said body comprises a front surface, a rear surface, a top edge, a bottom edge and first and second side edges and said tag comprises first and second prongs, said first prong being attached to said body proximate said first side edge and said second prong being attached to said body proximate said second side edge, said first prong extending toward said second side edge across said rear surface and said second prong extending toward said first side edge across said rear surface, so as to define the aperture between said rear surface and said first and second prongs.

* * * * *